(12) United States Patent
Klein et al.

(10) Patent No.: US 6,225,376 B1
(45) Date of Patent: May 1, 2001

(54) IN-SITU EMULSIFIED REACTIVE EPOXY POLYMER COMPOSITIONS

(75) Inventors: Dieter H. Klein, Buehl-Neusatz; Karin C. Joerg, Karlsbad, both of (DE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/101,907

(22) PCT Filed: Feb. 21, 1997

(86) PCT No.: PCT/US97/02695

§ 371 Date: Nov. 20, 1998

§ 102(e) Date: Nov. 20, 1998

(87) PCT Pub. No.: WO97/31962

PCT Pub. Date: Sep. 4, 1997

(30) Foreign Application Priority Data

Feb. 29, 1996 (GB) .................................................. 9604333

(51) Int. Cl.⁷ ................................ C08K 3/20; C08L 63/02

(52) U.S. Cl. ........................... 523/404; 523/417; 523/428
(58) Field of Search ..................................... 523/404, 417, 523/428

(56) References Cited

U.S. PATENT DOCUMENTS

| | | | |
|---|---|---|---|
| 3,929,717 | * | 12/1975 | Us . |
| 4,315,044 | * | 2/1982 | Elmore et al. ........................ 427/387 |
| 4,423,170 | * | 12/1983 | Waddill ................................ 523/414 |

FOREIGN PATENT DOCUMENTS

| | | | |
|---|---|---|---|
| 9312187 | * | 6/1993 | (WO) . |
| 9501387 | * | 1/1995 | (WO) . |

* cited by examiner

*Primary Examiner*—Robert Dawson
*Assistant Examiner*—D. Aylward

(57) ABSTRACT

An emulsified reactive epoxy polymer composition which is readily dispersed in water and is particularly suited for use in a coating composition which may be cured at ambient temperatures. The emulsifiable epoxy composition incorporates a hydrophilic polyoxyalkylene segment.

11 Claims, No Drawings

IN-SITU EMULSIFIED REACTIVE EPOXY POLYMER COMPOSITIONS

The invention relates to reactive epoxy polymer compositions emulsified in water comprising a polymeric epoxy emulsion and an emulsified reactive polymer curing composition. In another aspect, the invention relates to a process for preparing such water emulsified reactive polymer compositions. In yet another aspect, the invention relates to cured coatings resulting from further reaction of the water emulsified reactive polymer compositions on a suitable substrate.

Two-part epoxy resin based coating systems generally comprise a curable epoxy resin and a curing agent for the epoxy resin, and are commonly dispersed or dissolved in a solvent, primarily an organic solvent, to prepare coating compositions, for example paints and floor sealants. The use of such organic solvent-based coating compositions is discouraged on environmental grounds. On the other hand, such cured epoxy resin based coatings provide hard and abrasion resistant coatings which are resistant to, among others, hydrocarbons and aqueous media.

Water-based resin systems consisting of an epoxy resin and a curing agent dissolved or emulsified in water have been developed, and create less environmental and health concerns. The development of such systems is reviewed by Chou (Polymers Paint Colour Journal, Vol. 184,1994, pp 413–417). Water-based resin systems are described in U.S. Pat. No. 4,289,826, in GB-A-1,533,825, and in GB-A-1, 380,108. Known two part water-based epoxy resin emulsion coating compositions have significant disadvantages as described by Chou. In particular, the deficiencies of amidoamine adducts or modified polyamines which disperse liquid epoxy resin at the point of application is clearly described: these curing agents are normally made water dispersible by salt formation with volatile organic acids. These acids often create odor, flash rusting and water sensitivity problems. The problems of flash rusting and corrosion are dealt with in detail by M. A. Jackson, "Guidelines to Formulation of Waterborne Epoxy Primers", Polymers Paint Colour Journal, October 1990, Vol. 180, No 4270, pp 608–621 and by H. Leidheiser, Jr., "Mechanism of Corrosion Inhibition with Special Attention to Inhibitors in Organic Coatings", Journal of Coatings Technology, October 1988, pp 97–106.

In general, it is difficult to develop stable emulsions which have high solids content and low viscosity, and therefore good flowability. Furthermore, many of the known systems display poor coating properties, as they do not readily coalesce without solvents when coated on a substrate, resulting in cured coatings with poor mechanical flexibility and adhesion, high porosity and excessively high film formation temperature for ambient cure applications. Such systems have a limited balance between hydrophobic and hydrophilic properties, resulting in limited flexibility in the formulation of coatings. Such systems may also suffer from the inability to effectively incorporate pigments into the coating composition. Therefore, pigments are often blended with the curing agent by means of grinding or agitation.

U.S. Pat. No. 5,118,729 describes improved aqueous epoxy dispersions obtained by grafting an emulsifier containing polyoxyethylene residues by reaction on to a terminal epoxy reactive group of the epoxy molecule prior to dispersion.

U.S. Pat. No. 5,344,856 describes an emulsifiable epoxy resin composition which forms a water stable emulsion comprising the reaction product of a polyepoxide type compound with nominally difunctional $C_{12-36}$ fatty acids, dispersed by means of the addition of a surfactant wherein the surfactant comprises an alkyl aryloxy poly (propyleneoxy) poly (ethyleneoxy) ethanol or a $C_{12-36}$ hydrocarbyloxy poly (propyleneoxy) poly (ethyleneoxy) ethanol wherein the hydrocarbyloxy moiety is the residue of a $C_{12-36}$ fatty alcohol or $C_{12-36}$ fatty acid: standard chain terminating agents may be employed.

U.S. Pat. No. 3,297,519 describes epoxy resins which are self-dispersible in water without further dispersing aids in a concentration up to 10 percent by weight: the resins described are selected glycidyl ethers based on bisphenol-A containing tailored blocks of polyoxyethylene bridging the two bisphenol-A residues in the molecule. These products are used as components of paper finishes.

U.S. Pat. No. 5,319,004 describes water dispersible hardeners for epoxy resins produced from the reaction of specific polyamidoamides with specific polyamines and specific adducts of polyepoxy compounds with polyalkylene polyether polyols.

WO-A-9501387 describes the preparation of self-dispersible curable epoxy compositions prepared by the reaction of an epoxy resin with a polyhydric phenol and an amine-epoxy adduct: the amine-epoxy adduct is a reaction product of an aliphatic polyepoxide and a polyoxyalkylene-amine. The products described are asserted to require a catalyst to promote the amine-epoxy adduct reaction with the polyhydric phenol and epoxy resin, and the dispersion of the self dispersible, curable epoxy resin is stated to require high shear in specially designed equipment. Specific reaction sequencing is stated to be necessary in order to avoid post-addition of the amine-epoxy adduct to the epoxy resin, with such addition leading to unstable aqueous dispersions.

DE-A-4405148 describes water dispersible epoxy compositions derived from the reaction of aromatic epoxy resins, bisphenol-A and polyglycidyl ether polyepoxides, which resins may be cured with conventional amine curing agents for aqueous systems. Dispersion of the water-dispersible epoxy compositions are stated to require high shear.

JP-A-H6-179801 describes water-based curable epoxy resin compositions prepared from an epoxy resin, a self-emulsifiable active organic amine curing agent and water. Ease of dispersion is obtained by choice of the curing agent. The application of the technology described two epoxy resins with an epoxy equivalent weight of less than 200 is asserted: good leveling and film forming properties are asserted.

EP-A-EP 0617726 describes a water miscible or soluble amine-terminated resin useful as a curing agent for water-dispersible epoxy resins which amine-terminated resin is the reaction product of: 1) a polyamine component comprising one or more hydrophilic amine-terminated polyalkylene glycols, and, optionally, one or more hydrophobic polyamines; 2) a polyepoxide derived from a polyalkylene glycol or cycloalkylene glycol, and optionally hydrophobic polyglycidyl ethers, and, optionally, an amine extender having two active amine hydrogen atoms, and reaction products therefrom; 3) optionally a reactive diluent; and 4) optionally a catalyst for the reaction of an amine with an epoxy resin.

Despite the improvements made to date, the formation of stable aqueous dispersions of emulsified reactive polymer compositions derived from epoxy resins with an epoxy equivalent weight greater than 350 and aqueous dispersed or dispersible curing agents is generally difficult. Dispersions of such compositions containing no solvent, exhibit a viscosity higher than optimal. In particular, two-component pre-dispersed compositions are desired which cure at low ambient temperature to provide final coatings with good mechanical properties.

It is desirable to provide emulsified reactive epoxy polymer compositions which can be produced in presently employed industrial reactors. It is also desirable that such reactive epoxy polymer compositions should be stable without the addition of acid or a significant quantity of organic solvent, in order to optimize final coating properties. It is further desirable that such reactive epoxy polymer compositions should also accept and disperse the commonly used hydrophobic curing agents, which may be required in certain applications to allow economically attractive low ambient temperature curing while still providing final coatings with excellent mechanical properties.

The present invention provides a reactive polymer emulsion preparable by:
(i) reacting at least one polyepoxide (II) with at least one polyoxyalkylene glycol diglycidyl ether (III), optionally a polyhydroxy hydrocarbon (IX), and optionally an advancement catalyst(XI), to produce a first reaction product,
(ii) reacting the first reaction product with a polyoxyalkylenediamine and optionally at least one further amine (V), to produce a second reaction product (VIII),
(iii) emulsifying the second reaction product (VIII) in water to provide an aqueous polymeric epoxy emulsion (VII) and
(iv) dispersing or dissolving a curing agent (XII) in the aqueous polymeric epoxy emulsion (VII) of the reaction product (VIII) to provide an emulsified reactive polymer composition (I), wherein the organic solvent content, if any, of the of the composition (I) is not more than 1.5 percent.

The said at least one further amine preferably includes a monofunctional amine, a polyamine, or a mixture of two or more thereof.

The invention also provides a process for preparing a reactive polymer emulsion (I) comprising:
(i) reacting at least one polyepoxide (II) with at least one polyoxyalkylene glycol diglycidyl ether (III), optionally a polyhydroxy hydrocarbon (IX), and optionally an advancement catalyst (XI), to produce a first reaction product,
(ii) reacting the first reaction product with a polyoxyalkylenediamine and optionally at least one further amine (V), to produce a second reaction product (VII),
(iii) emulsifying the second reaction product (VII) in water to provide an aqueous polymeric epoxy emulsion (VII) and
(iv) dispersing or dissolving a curing agent (XII) in the polymeric epoxy emulsion (VII) to provide an emulsified-reactive polymer composition (I), wherein the organic solvent content, if any, of the composition (I) is not more than 1.5 percent.

In a further aspect, the invention provides a coating composition comprising the cured product derived by curing the emulsified reactive epoxy polymer composition (I).

The emulsified reactive polymer composition (I) demonstrates good stability, wettability and viscosity characteristics. Furthermore, the coatings prepared from the emulsified reactive epoxy polymer composition (I) demonstrate good adhesion coalescence, flexibility, resiliency and toughness.

The term "emulsion" is used herein to indicate a stable mixture, wherein in the polymeric epoxy emulsion (VII) or the dispersion of curing agent (XII) the continuous phase is water and the dispersed phase is the emulsified reactive epoxy polymer composition or the curing agent (XII). The term "emulsifiable" as used herein describes matter which is capable of forming a stable oil in water emulsion. The term "emulsified" as used herein indicates matter present in the dispersed phase. The term "stable emulsion" as used herein refers to an emulsion in which the dispersed components do not settle to the bottom and form a solid cake at ambient temperature for a period of six months at 23° C. The term "stable emulsion" as used herein does not exclude compositions in which some settling of particles with time to form a soft deposit which is easily redispersible by agitation occurs. This six months emulsion stability at 23° C. may be simulated in a test where emulsion stability over a four week period at 40° C. is observed.

The term "reactive polymer" is used herein to indicate a polymeric species capable of further chemical reaction by virtue of reactive functional groups present within the polymer backbone, pendant to the polymer chain or terminal to the polymer chain.

The term "polyepoxide" as used herein indicates a compound which contains, on average, more than one epoxy moiety per molecule. Also included are partially advanced epoxy resins, that is, the reaction product of a polyepoxide and a polyhydroxy hydrocarbon compound wherein the reaction product has an average of more than one unreacted epoxide unit per molecule. Polyepoxides (polyglycidyl ethers of a polyhydroxy hydrocarbon) may be prepared by reacting an epihalohydrin with a polyhydroxy hydrocarbon or a halogenated polyhydroxy hydrocarbon. Such preparation is well known in the art. See Kirk-Othmer Encyclopedia of Chemical Technology 3rd Ed. Vol. 9 pp. 267–289.

The epihalohydrins correspond to Formula 1 wherein:

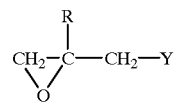

1

Y is a halogen, preferably chloro or bromo, and most preferably chloro;

and R is hydrogen or $C_{1-14}$ alkyl, and more preferably methyl.

Polyhydroxy hydrocarbon means herein a compound with a hydrocarbon backbone and on average more than one primary or secondary hydroxy moiety, preferably the average hydroxy moieties per hydrocarbon molecule is two or more. Halogenated polyhydroxy hydrocarbon means herein a polyhydroxy hydrocarbon which is substituted with one or more halogens. The hydroxyl moieties may be bound to aromatic aliphatic or cycloaliphatic moieties. Among preferred classes of polyhydroxy hydrocarbons and halogenated polyhydroxy hydrocarbons are the bisphenols; halogenated bisphenols; hydrogenated bisphenols; and novolac resins, that is, the reaction product of phenols and simple aldehydes, preferably formaldehyde. The reaction product of phenol and an aldehyde, preferably formaldehyde, is a well-known product, as is the process for its production. Such a product is commonly referred to as a novolac resin.

Preferred polyhydroxy compounds (IX) useful in this invention pond to Formula 2

wherein:
A is an aryl moiety; aryl moiety substituted with an alkyl or halo moiety; a polyaryl moiety wherein the aryl moieties are connected by direct bonds, alkylene, haloalkylene, cycloalkylene, carbonyl, sulfonyl, sulfinyl, oxygen, or sulfur, such poly aryl moieties being optionally substituted with one or more alkyl or halo moieties; or the oligomeric reaction product of an aldehyde and phenol;
and u is greater than 1. Preferably u is from greater than 1 to 10, even more preferably from greater than 1 to 3, and most preferably, from 1.9 to 2.1.

More preferred polyhydroxy hydrocarbons and halogenated polyhydroxy hydrocarbons include those corresponding to Formulas 3 to 6:

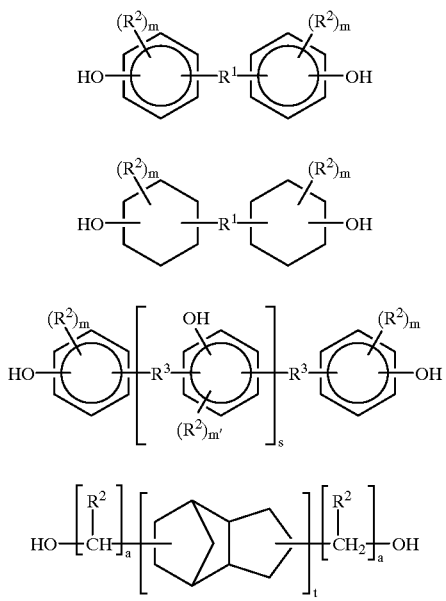

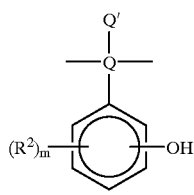

wherein $R^1$ is separately in each occurrence $C_{1-10}$ alkylene, $C_{1-10}$ haloalkylene, $C_{4-10}$ cycloalkylene, carbonyl, sulfonyl, sulfinyl, oxygen, sulfur, a direct bond or a moiety corresponding to Formula 7

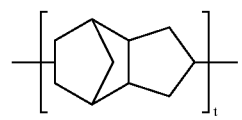

$R^2$ is separately in each occurrence $C_{1-3}$ alkyl or a halogen;
$R^3$ is separately in each occurrence $C_{1-10}$ alkylene or $C_{5-50}$ cycloalkylene;
Q is separately in each occurrence a tetravalent $C_{1-10}$ hydrocarbyl moiety;

Q is separately in each occurrence hydrogen, cyano, or a $C_{1-14}$ alkyl group;
a is in each occurrence 0 or 1;
m is independently in each occurrence from 0 to 4;
m' is separately in each occurrence from 0 to 3; s is from 0 to 4; and
t is from 1 to 5.

Even more preferable polyhydroxy hydrocarbons are those represented by Formulas 3 and 4 and 5.
$R^1$ is preferably $C_{1-3}$ alkylene, $C_{1-3}$ haloalkylene, carbonyl, sulfur, or a direct bond; more preferably a direct bond, propylene, or fluorinated propylene ($-C(CF_3)_2-$); and most preferably propylene. $R^2$ is preferably methyl, bromo or chloro; and most preferably methyl or bromo. $R^3$ is preferably $C_{1-3}$ alkylene or a polycyclic moiety corresponding to Formula 8

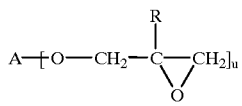

wherein:
t is from 1 to 5 inclusively, preferably from 1 to 3, and most preferably 1. Preferably, m' is from 0 to 2. Preferably, m is from 0 to 2. Preferably, s is from 0 to 8; and more preferably from 0 to 4.

Among preferred polyhydroxy hydrocarbons are the dihydroxy phenols. Preferable dihydroxy phenols include those which contain substituents that are non-reactive with the phenolic groups. Illustrative of such phenols are 2,2-bis(3,5-dibromo-4-hydroxyphenyl) propane; 2,2-bis(4-hydroxyphenyl) propane; 2,2-bis(3,5-dichloro-4-hydroxyphenyl) propane; bis(4-hydroxyphenyl) methane; 1,1-bis(4-hydroxyphenyl)-1-phenylethane; 1,1'-bis(2,6-dibromo-3,5-dimethyl-4 hydroxyphenyl) propane; bis(4-hydroxyphenyl) sulfone; bis(4-hydroxyphenyl) sulfide; resorcinol and hydroquinone. The preferred dihydroxy phenolic compounds are 2,2-bis(4-hydroxyphenyl) propane (bisphenol A), 2,2 bis(4-hydroxyphenyl) methane (bisphenol F) and 2,2-bis(4-hydroxy-3,5-dibromophenyl) propane.

Cycloalkylene as used herein refers to monocyclic and polycyclic hydrocarbon moieties. As used herein haloalkyl refers to a compound with a carbon chain and one or more of the hydrogens replaced with a halogen. Haloalkyl also means compounds wherein all of the hydrogen atoms have been replaced by halogen atoms. Alkylene as used herein refers to a divalent alkyl moiety.

The polyepoxides useful in the invention preferably correspond to Formula 9 wherein A, u and R are previously defined.
Preferably the polyepoxides are chosen such that the reaction product (VIII) is not significantly crosslinked. Such highly crosslinked reaction products form gels and do not form good coatings. Some branching may be present as long as the reaction product does not form a gel.

The polyepoxides more preferably correspond to one of Formulas 10 to 13

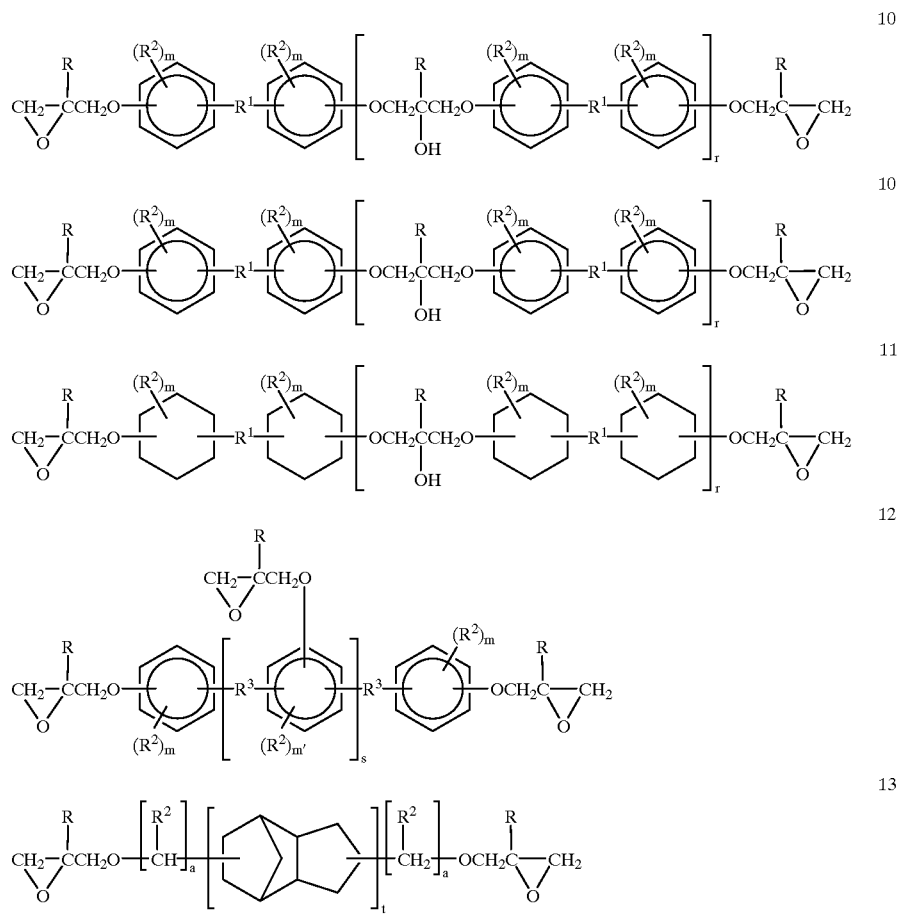

wherein R, $R^1$, $R^2$, $R^3$, a, m, m', s and t are as defined previously; r is from 0 to 40. Preferably, r is from 0 to 10, and most preferably 1 to 5. Preferably, s is from 0 to 8; and most preferably 0 to 4. The symbols, a, m, m', r, s, and t may represent an average number, as the compounds to which they refer are generally found as a mixture of compounds with a distribution of the units to which they refer.

If a polyepoxide corresponding to Formula 12 is used in the preparation of reaction product (VIII), then s should be chosen such that the reaction product is not crosslinked to a stage that gel formation occurs. Preferably, s is from 0 to 3.

Polyoxyalkylene glycol diglycidyl ether (III) as used herein refers to a compound or a mixture of compounds which contains, on average, more than one epoxy moiety per molecule, and which may be prepared by reacting an epihalohydrin corresponding to Formula (1) with one or more polyhydroxy compounds or halogenated polyhydroxy compounds corresponding to Formula (14)

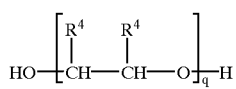

where $R^4$ is separately in each occurrence hydrogen, methyl, halomethyl, or ethyl, with a proviso that if one $R^4$ on an alkoxy unit is ethyl the other must be hydrogen;

and q is from 1 to 400. Preferably, q is from 20 to 350, more preferably from 40 to 300. The symbol q represents an average number, as the compounds to which it refers are generally found as a mixture of compounds with a distribution of units to which q refers.

The polyoxyalkylene glycol diglycidyl ethers (III) correspond to Formula 15

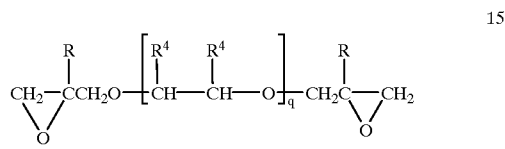

wherein R, $R^4$ and q are as defined previously.

In reaction product (VII) the polyepoxide (II) used preferably corresponds to Formulas 10, 11, or 12, and the polyoxyalkylene glycol diglycidyl ether (III) corresponds to the Formula 15. In another preferred embodiment, the polyepoxide (II) used in reaction product (VIII) is from 85 to 99.5 percent by weight of polyepoxides corresponding to Formulas 10, 11, and 12, and 0 to 15 percent by weight of the polyoxyalkylene glycol diglycidyl ether (III) corresponding to Formula 15. In a more preferred embodiment 85 to 99.5 percent of the polyepoxide used in reaction product (VIII) corresponds to Formula 10 and 0.5 to 15 percent of the polyoxyalkylene glycol diglycidyl ethers (III) corresponds to Formula 15.

The amine composition (V) is present in sufficient quantity such that in combination with the polyoxyalkylene glycol diglycidyl ether (III) the polymeric epoxy reaction product (I) has sufficient hydrophilic-lipophilic balance that the polymeric epoxy reaction product (I) is water dispersible. Hydrophilic (poly)amines or hydrophobic (poly)amines may be present in the amine composition. The polyoxyalkylene diamine (V) is a polyalkylene glycol terminated with primary or secondary amine moieties. The polyalkylene glycol chains useful herein can comprise units derived from $C_{2-8}$ oxides, or $C_{2-8}$ glycol ethylene oxide, propylene oxide, butylene oxide, ethylene glycol, propylene glycol, butylene glycol, a butane diol (such as 1,4-butane diol), tetrahydrofuran, a propane diol (such as 1,2- or 1,3-propane diol) or a mixture thereof. Preferably the polyoxyalkylene glycol chain is comprised of units derived from ethylene oxide, propylene oxide, a mixture of ethylene oxide and propylene oxide, or tetrahydrofuran and more preferably of units derived from ethylene oxide or a mixture of units derived from ethylene oxide and propylene oxide. In those embodiments where the polyoxyalkylene glycol chain contains a mixture of units from different alkylene oxides, the arrangement of the different alkylene oxide units may be random or in blocks of the same alkylene oxide. The polyoxyalkylene diamine require sufficient alkylene oxide derived units so that polyoxyalkylene diamine and hydrophilic polyepoxides present render the final amine-terminated resin water soluble or miscible. Preferably, the polyoxyalkylene diamine has an average molecular weight of from 200 to 4000, and more preferably of from 300 to 3000, most preferably. Preferably the polyoxyalkylene diamine useful in the invention correspond to the Formula 16

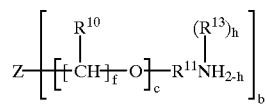

wherein:

$R^{10}$ is independently in each occurrence hydrogen, methyl or ethyl;

$R^{11}$ is independently in each occurrence a $C_{1-10}$ straight- or branched-chain alkylene, $C_{1-10}$ straight- or branched-chain alkenylene, or a $C_{5-12}$ divalent cycloaliphatic moiety;

$R^{13}$ is independently in each occurrence a $C_{1-10}$ straight- or branched-chain alkyl moiety or hydrogen;

Z is independently in each occurrence oxygen or

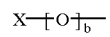

X is independently in each occurrence a straight- or branched-chain $C_{1-6}$ alkyl moiety;

c is independently in each occurrence 1 or greater;

b is independently in each occurrence 2 or 3;

f is independently in each occurrence from 2 to 4; and h is independently in each occurrence 0 or 1;

with the proviso that for each

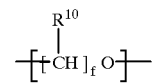

unit if f is 2 and one $R^{10}$ is ethyl, then the other $R^{10}$ must be hydrogen, and if f is 3 or 4, $R^{10}$ is hydrogen.

Preferably Z is oxygen. Preferably X is a $C_{2-4}$ alkylene moiety.

Preferably $R^{10}$ is hydrogen or methyl and more preferably hydrogen. Preferably $R^{11}$ is a $C_{1-10}$ straight- or branched-chain alkylene moiety and more preferably a $C_{2-4}$ alkylene moiety. Preferably c is from 2 to 6 and more preferably from 2.6 to 3. Preferably b is 2. Preferably h is 0.

Such polyoxyalkylene diamines are well known in the art. Examples of preferred polyoxyalkylene diamines are the polyamines available from Texaco Chemicals Company (Houston, Tex., USA) under the trade name JEFFAMINE, for example, JEFFAMINE D 400, JEFFAMINE D 2000.

The additional amines which may optionally or alternatively be present include amines containing at least one primary or secondary amine moiety which are capable of reacting with an epoxy resin; preferably such compounds are sterically hindered. The term "sterically hindered" in reference to a polyamine means that the amine group is located on a secondary or tertiary carbon which is in a sterically hindered position. Preferably such polyamines correspond to Formulas 17 or 18

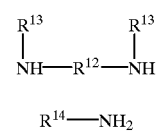

wherein $R^{13}$ is previously defined, $R^{12}$ is independently in each occurrence cyclohexyl, substituted cyclohexyl, or a $C_{1-50}$ hydrocarbylene moiety, which may be substituted with a non-interfering substituent and which may contain one or more secondary amines, ether, amine or thioether moieties in the backbone. $R^{12}$ is preferably cyclohexyl, or a $C_{2-8}$ hydrocarbylene moiety, optionally containing amide or secondary amino moieties in the backbone. $R^{13}$ is preferably hydrogen or a $C_{1-4}$ straight- or branched-chain alkylene moiety. In Formula 16, $R^{13}$ is most preferably hydrogen. In Formula 18, $R^{14}$ is preferably a $C_{1-25}$ linear, branched, alicyclic or polyalicyclic moiety. Examples of preferred amines include t-octylamine, N,N'-di-tertiarybutyl ethylene diamine and 2,6-dimethylcyclohexylamine.

These polyamines are included in the composition in sufficient amounts to enhance the final mechanical properties of the coatings prepared upon cure. If too much of certain polyamines are used the final resin may not be sufficiently emulsifiable in water.

Polymeric epoxy emulsion (VII) as used herein refers to a dispersion of epoxy-terminated molecules as particles in water in the size range typified as an emulsion prepared as described in this invention. In general, it is preferable to produce resin emulsions with small droplet diameters of a median value of about 1.5 micrometers. Usually a distribution of droplet diameters is obtained for the polymeric epoxy emulsion particles of from 0.8 to 7.0 micrometers. Some settlement may occur on prolonged standing or when the emulsions are highly dilute: this settlement is easily reversible by thorough stirring at low shear, for example, hand stirring is sufficient for up to 20 liters.

The polyhydroxy hydrocarbon (IX) means herein a compound with a hydrocarbon backbone and on average more than one primary or secondary hydroxy moiety, preferably two or more. Halogenated polyhydroxy hydrocarbon means herein a polyhydroxy hydrocarbon which is substituted with one or more halogens. The hydroxyl moieties may be bound to aromatic aliphatic or cycloaliphatic moieties. Among preferred classes of polyhydroxy hydrocarbons and halogenated polyhydroxy hydrocarbons are the bisphenols; halogenated bisphenols; hydrogenated bisphenols; novolac resins, that is, the reaction product of phenols and simple aldehydes, preferably formaldehyde; and polyalkylene glycols. The reaction product of phenol and an aldehyde, preferably formaldehyde, is a well-known product, as is the process for its production. Such a product is commonly referred to as a novolac resin.

Optionally, the emulsifiable composition comprising reaction product (VII) may further comprise an organic solvent (X), present in sufficient amounts to stabilize the epoxy emulsion in water. Optionally, such solvent is present in amounts of up to 10 weight parts, more preferably 0 to 5 weight, and most preferably from 0 to 1.5 weight parts of solvent per 100 weight parts of reaction product (VII). Preferred solvents include glycols based on alkylene glycols, and ethers thereof, alkyl or hydroxyalkyl-substituted benzenes, lower alkanols, γ-butyrolactone, γ-caprolactone and n-methyl pyrrolidone. The preferred alkylene glycols are those based on ethylene, propylene, and butylene oxide. The glycol ethers are alkyl ethers of such glycols. Preferred glycols are those based on propylene oxide and butylene oxide, with preferred glycol ethers being $C_{1-4}$ alkyl ethers of propylene and butylene glycols. The most preferred glycol ethers are the $C_{1-4}$ alkyl ethers of propylene glycol. Examples of the preferred solvents are methyl ether of propylene glycol, benzyl alcohol, isopropyl alcohol, butyrolactone, γ-caprolactone, n-methyl pyrrolidone, and xylene.

Catalysts (XI) which may be employed to facilitate the preparation of reaction product (VIII) of the polyepoxide compound with the one or more polyhydroxy hydrocarbons are those known to those skilled in the art for the reaction of epoxy moieties with active hydrogen containing compounds. Examples of useful catalysts include zinc carboxylate, organozinc chelate compound, trialkyl aluminum, quaternary phosphonium and ammonium salts, tertiary amines and imidazole compounds. The catalyst is generally employed in an amount of from 0.01 to 2; preferably 0.02 to 1, most preferably 0.02 to 0.1, weight percent based on the combined weight of the polyepoxide compound (II) and the optional polyhydroxy hydrocarbons (IX) used.

Preferable curing agents (XII) which may be used in this invention are those which are soluble or dispersible in the polymeric epoxy emulsion reaction product (VII) and which contain more than 2 active hydrogen atoms per molecule. Included as curing agents (XII) are diamines and polyamines or adducts of such polyamines with epoxy resin, such as for example a reaction product of an excess of equivalents of isophorone diamine with a diglycidyl ether of bisphenol A wherein such reaction product preferably has an amine equivalent weight of 115; modified polyamides and amidoamines, and arylic anhydrides. Preferred are the polyamines. Also useful as curing agents are aminoalkylated interpolymers of vinyl carboxylic acids, and salts thereof, as described in U.S. Pat. No. 4,227,621 and the self-dispersing curing agents described in the copending application GB 9604297.3 filed Feb. 29, 1996. Preferred curing agents include aliphatic polyamines, polyglycoldiamines, polyoxypropylene diamines, polyoxypropylene-triamines, amidoamines, imidazolines, reactive polyamides, polycyclic polyamines, ketimines, arylaliphatic)polyamines (that is, xylylene-diamine), cycloaliphatic amines (that is, isophoronediamine or diamino-cyclohexane) methane diamine, 3,3-dimethyl-4,4-diaminodicyclohexyl-methane, heterocyclic amines (aminoethyl piperazine), aromatic polyamines, (methylene dianiline), diamino diphenyl sulfone, mannich base, phenalkamines and N,N',N"-tris(6-aminohexyl) melamine. Example of more preferred curing agents include modified polyamide curing agents like Casamid™ 360 (Anchor Chemicals Ltd., Manchester, United Kingdom), or Epilink™ DP 660 (Akzo, Deventer, The Netherlands) which is an amine-epoxy adduct. Other useful hardeners may be of the Mannich base class which are reaction products between nonyl phenol, formaldehyde and a polyamine for example, xylylenediamine. Such a product is sold by Akzo under the trade name Epilink™ DP 500.

The epoxy resin composition of this invention is contacted with sufficient curing agents to cure the resin. Preferably the ratio of (epoxy glycidyl ether) equivalents to equivalents of curing agent is from 0.5:1 and 2:1; more preferably 0.6:1.4 to 1.4:0.6; even more preferably 0.8:1.2 to 1.2:0.8 and most preferably 0.9:1.1 to 1.1:0.9.

The emulsions of this invention may include pigments, dyes, stabilizers, plasticizers and other conventional additives. Preferably the formulation dispersion or emulsion in water has a solids level of from 40 to 80 percent, and most preferably from 50 to 70.

When used to form a coating, the emulsified reactive polymer compositions of this invention are contacted with a substrate. Water and any cosolvents used are then evaporated off to leave a coating. The coating will cure at ambient conditions in several days. Elevated temperatures may be used to speed up the cure of the coating composition. Such curing conditions are well known to those skilled in the art. The coating composition may be contacted with the substrate by any means known in the art including spraying, pouring or roller-coating the formulation.

Insofar as epoxy advancement reactions are carried out in order to produce an advanced polyepoxide, procedures for performing such reactions well known in the art are used: see "The Handbook of Epoxy Resins", H. Lee and K. Neville (1967), McGraw Hill, New York and U.S. Pat. Nos. 2,633,458; 3,477,990; 3,821,243; 3,907,719; 3,975,397; and 4,071,477. Common catalysts for epoxy advancement reactions, and common chain regulators and chain terminators well known in the art may be employed.

In producing coating formulations, the use of pigments, slip additives, fillers, dispersing aids, defoamers, leveling agents, air release agents and other additives commonly applied in the industry have been applied.

Epoxy Emulsion Quality

The quality of an applied and cured emulsified two-component epoxy binder system depends greatly on the quality of the emulsion, particularly on the droplet size and distribution. Emulsion quality particularly influences the film formation, drying time, water resistance, gloss, pigment binding capacity, yield, flexibility, adhesion and hardness.

Compared with conventional solvent systems, water dispersed resins tend to foam more when they are produced and when they are applied. This undesirable build-up of foam may result from the impact of mechanical energy during emulsification procedures particularly when the process is not run under vacuum. Foam can lead to blemishes in appearance such as pitting, bubbles, and fish-eyes. The non-ionic emulsifiers in the experimental epoxy resins were selected also for their ability to furnish low foam emulsions. However, additives such as BYK 023 (Byk Chemie, Wesel, Germany) antifoaming agent, may be added to the epoxy-terminated species before they are emulsified. Defoamer should be added in a concentration of 0.04 to 0.5 percent.

Flocculation or aggregation of resin droplets can cause uneven and matted surfaces. The droplet size of the emulsion has a variable influence on different properties of the film.

Properties like gloss, water-resistance, stability and pigment-binding, seem to suffer with increased droplet particle size while drying time, hold-out and brush ability improves with increased droplet particle size. Clearly a balance of properties is sought.

In general it is preferable to produce resin emulsions with small droplet diameters of a medium value of about 1.5 micrometers. Usually a distribution of droplet diameter is obtained for the experimental epoxy resins of 0.8 and 7 micrometers. However, some settlement might occur upon prolonged standing and when the emulsions are highly diluted. Therefore thorough stirring of the emulsion is necessary before taking fractional amounts out of the container to avoid inconsistencies due to concentration differences.

In one embodiment, this invention provides, as an aqueous dispersion, a blend of an aqueous epoxy-terminated polymeric amino-epoxy adduct emulsion (VII) and a curing agent (XII), the aqueous epoxy-terminated polymeric amino-epoxy adduct (VII) comprising the reaction product of from 30 to 90 parts by weight, preferably 50 to 85 parts by weight, more preferably 60 to 80 parts by weight of one or more aromatic polyepoxides (II) of average molecular weight greater than 300, from 2 to 50 parts by weight, preferably 5 to 30 parts by weight, most preferably 10 to 20 parts by weight of a polyoxypropylene diglycidyl ether (III) having an average molecular weight of 250 to 12,000 and from 2 to 50 parts by weight, preferably from 5 to 30 parts by weight, most preferably from 10 to 20 parts by weight of an compound (V), the aqueous epoxy-terminated polymeric amino-epoxy adduct (VII) having an epoxy equivalent weight (EEW) based on solids of from 178 to 1000, preferably from 250 to 750, most preferably from 400 to 650. The aqueous epoxy-terminated polymeric amino-epoxy adduct emulsion is blended with a curing agent, the curing agent (XII) being present as an aqueous solution or dispersion, or the curing agent being dispersible in the aqueous epoxy-terminated polymeric amino-epoxy adduct emulsion, to produce an aqueous emulsified reactive polymer composition (I).

In a further embodiment, the aromatic polyepoxides and polyoxypropylene diglycidyl ethers may be (co)-advanced with each other or with a polyhydric phenol or with an alcohol by standard means known to those skilled in the art to provide higher molecular weight epoxy-terminated species prior to reaction with the amine compound.

A further embodiment is a process by which the aqueous emulsified reactive polymer composition is prepared. In this process, the polyepoxides and amines are mixed in the liquid phase at a temperature of between 70° C. and 135° C., more preferably between 80° C. and 130° C., most preferably between 85° C. and 125° C. The reaction of the polyepoxides with the amines takes place at a temperature of between 80° C. and 200° C., more preferably between 80° C. and 180° C., and most preferably between 80° C. and 160° C. The emulsification of the resulting product in water takes place at a temperature between 50 and 110° C., more preferably between 50° C. and 100° C., most preferably between 50° C. and 90° C. To produce an aqueous epoxy-terminated polymeric amino-epoxy adduct emulsion, the aqueous epoxy-terminated polymeric amino-epoxy adduct emulsion and the curing agent is mixed at ambient temperature under conditions of low shear agitation. Generally, hand agitation or mixing in conventional equipment used in the art at less than 100 rpm (revolutions per minute) is sufficient to emulsify the amino-epoxy adduct and curing agent in water. Higher agitation speeds may be used, but are not required.

Further embodiments are cured coatings derived from the ambient cure of the aqueous emulsified reactive polymer compositions. The stable epoxy-terminated emulsion as described above provides a stable emulsified reactive polymer composition, which, upon cure at a temperature between 5° C. and 35° C., preferably between 10° C. and 30° C., for a period of between 5 and 75 hours, preferably between 10 and 50 hours, at a relative humidity of between 10 and 100 percent, preferably of between 25 and 60 percent, provides a glossy cured film exhibiting good cure properties, good Pendulum Hardness resistance and good chemical resistance.

Clear coating formulations and pigmented formulated formulations were produced using methods common in the industry and well known to those skilled in the art.

The test methods used in evaluating cure characteristics and coating properties are also common in the industry and well known to those skilled in the art. The specific test methods used are now referred to or described.

Further embodiments are cured coatings derived from the ambient cure of the aqueous emulsified reactive polymer compositions. The stable epoxy-terminated emulsion as described above provides a stable emulsified reactive polymer composition, which, upon cure at a temperature between 5° C. and 35° C., preferably between 10° C. and 30° C., for a period of between 5 and 75 hours, preferably between 10 and 50 hours, at a relative humidity of between 10 and 100 percent, preferably of between 25 and 60 percent, provides a glossy cured film exhibiting good cure properties, good Pendulum Hardness resistance and good chemical resistance.

Clear coating formulations and pigmented formulated formulations were produced using methods common in the industry and well known to those skilled in the art.

The test methods used in evaluating cure characteristics and coating properties are also common in the industry and well known to those skilled in the art. The specific test methods used are now referred to or described.

Pigmented Formulations

For the pigmented coating studies described in this invention a variety of paint was produced.

First the curing agent and pigments were mixed at 2500 rpm in a Dispermat FT (VMA Getzmann, Reichshof, Germany) for 5 minutes. To the pigment paste, glass beads of 2 mm diameter had been added so that the pigment paste to glass bead weight ratio was 1:1. Then milling was carried out under water cooling for 25 minutes at 2500 rpm. After the milling water and defoamer had been added to the mill base, the pigmented mixture was allowed to be stirred for another 5 minutes at 1000 rpm. Grindometer readings were taken from the pigment paste both after milling, and also on the following day in order to reconfirm the values. In some cases air bubbles contained in the paste prevented an immediate measurement. The average particle size of the pigment paste was ca. 10 micrometers.

Coating Application

Coatings were either drawn down with an Erichsen applicator (Erichsen, Hemer-Sundwig, Germany) or air-sprayed to a predetermined film thickness of 50 to 60 micrometers in a one-coat application for physical tests (curing rate, and gloss, flexibility,). All chemical resistance tests were conducted on one coat applications of ca. 90 micrometers dry film thickness.

Substrates

Three substrates were employed in the testing.
1. Sand blasted cold-rolled steel with a 40 micrometer peak to valley profile for salt-spray resistance. This was conducted on two-coat applications. Buildup on each coat was approximately 50 to 60 micrometer thickness and 1 day was allowed between coats for curing at ambient conditions.
2. Bonder steel 26–60–° C. (190 mm×105 mm×0.75 mm) for physical tests.
3. Glass plates to follow gloss and transparency during pot life and film formation.

Curing Conditions Used for the Studies

Test panels were allowed to cure at ambient conditions (23° C./45 to 55 percent RH) on the following schedule prior to testing:
1. Physical properties—7 days
2. Resistance properties—three weeks (minimum) exceptions to these conditions and schedules are obvious and noted in the data tables.
3. Cure under adverse conditions examines curing characteristics at 10° C. and at very high humidity of ca. 80 percent RH (relative humidity). In this case panels are examined after removal from the test environment to determine any lasting adverse effects like flash rusting.

Physical Tests

Through Film Drying Time (TFDT)

Through film drying time is a measure of the various stages and rates of film formation in the drying or curing of organic coatings for the purpose of comparing types of coatings or ingredient changes, or both. The procedure followed is, in principle, covered by ASTM D1640-83, however here an Erichsen drying time recorder (Model 509, Erichsen, Hemer-Sundwig, Germany) is used. This is a recorder which pulls a needle with a constant speed over a glass bar on which a coating has been drawn.

Methyl Ethyl Ketone (MEK) Resistance/Double Rubs

This test monitors the resistance of a coating against MEK in the initial phase of cure as a function of the time elapsed after application. Coatings are prepared on steel and after the coating is tack-free, the dry film thickness of the system to be tested and a reference system is determined. The dry film thickness should differ by not more than 10 percent. The actual test is then performed as follows: the flat end of a 500 g hammer is covered with a piece of cotton-wool. The cotton-wool is soaked with MEK and a hammer is brought to one side of the panel. The hammer is moved forth-and-back over the whole coating, being one double rub. Care has to be taken not to put any additional pressure on the hammer. After every 20 double rubs the cotton-wool is re-soaked with MEK. The procedure is repeated until the coating is rubbed off to such an extent that the panel becomes visible or other defects occur. This test is repeated daily until the application withstands 100 double rubs without visible effect. The difference in MEK double rub development gives an indication of the rate at which cross-linking is achieved.

Gloss

Readings are made using a gloss meter (Type L, Dr. Lange, Berlin, Germany) and measured at 20°, 60° and 80° angles of reflection.

Pendulum Hardness Development

This test method uses a pendulum damping tester as a measure of the rate of cure by means of hardness development of organic coatings that have been applied to acceptable plane rigid surfaces. The test follows the proposal by ASTM D4366-84 method B: "Hardness of organic coatings by pendulum (Persoz) damping test".

Sudden Impact Resistance

Impact tests were conducted using a Gardner Heavy Duty Variable Impact Tester. Reverse (substrate between the impacter and the test coating) and direct (impacter applied to coating) impact tests were conducted. Results are reported as the force (Joules) necessary to cause failure (cracking) of the film; therefore, the higher the reading—the more flexible the film.

Film Thickness

This test is performed following the guide-lines by ASTM DI 186-81; "Non-destructive measurement of dry film thickness of non-magnetic coatings applied to ferrous base" (11).

Adhesion

The cross-cut test is a simple empirical test to determine the adhesion of a one or more coat system on its substrate as well as the intercoat adhesion. This test was performed in accordance with ASTM D3359-83: "Measuring adhesion by tape test", method B. This method covers a procedure for assessing the adhesion of coating films to metallic substrates by applying and removing tape over cuts made in the film. In the examples described in this report TESAPACK 4124 tape is used.

Resistance Against Slow Deformation/Erichsen Indentation

This empirical test gives an indication about the resistance of a coating system against cracking and/or loss of adhesion due to deformation of the substrate. The test is performed in accordance with DIN/ISO 1520 of February 1982: "Tiefungspruefung".

Chemical Resistance

This test gives a quick indication about the chemical resistance and is to be used on a relative basis only.

A piece of cotton-wool of approximately 1 cm diameter is saturated with the chemical against which the coating has to be tested. The chemicals for this purpose were:

Deionized water, ethanol, xylene, toluene, gasoline, aqueous sodium hydroxide solution (10 percent by weight.), aqueous acetic acid solution (10 percent by weight.), aqueous hydrochloric acid solution (10 percent by weight.) and aqueous sulfuric acid solution (10 percent by weight.). The cotton-wool is covered with a glass lid of 50 mm diameter and a height of 30 mm which is sealed with silicon grease to the coating. Hourly or daily the appearance of the coating is judged by means of determining the degree of blistering, and discoloration. The test is performed for one week. The results of blistering and visual surface test like color changes or softening have been monitored and rated on a scale of 0 (poorest) to 10 (best).

Salt Spray

Tests were conducted in a salt-fog cabinet saturated with a fog from a 5 percent salt solution. Test temperature was 55° C. The panel was inscribed with the Greek letter lambda through to the substrate. Panels were examined after 500, 750 and 1000 hours exposure. Failure to protect the substrate is indicated by severe blistering or creepage from the scribe in excess of 6 mm.

Humidity Resistance

Tests were conducted in a 40° C. and 100 percent humidity cabinet. Examinations occurred after 550, 750 and 1000 hours exposure. Failure to protect the substrate, was indicated by blistering.

The following examples are included for illustrative purposes and are not intended to limit the scope of claims herein. All parts and percentages stated herein are by weight, unless otherwise indicated.

EXAMPLE 1

A one liter, five-neck round-bottom glass reactor equipped with a nitrogen inlet, water cooled condenser and metal anchor design agitator driven by an electric motor was used. A 250 mL dropping funnel was employed. Temperature control was provided by a thermocouple, heating mantle and temperature controller.

Diglycidyl ether of Bisphenol-A having an epoxy equivalent weight (EEW) of 180 (A, 360 g) and a polyoxyalkylene diglycidyl ether having an epoxy equivalent weight of 5450 and an ethylene oxide/propylene oxide mole ratio of 5:1 (B, 60 g) were charged into the reactor and heated within 30 minutes to 100° C. under a nitrogen blanket. Agitation was applied after B was molten, and 2,6-dimethyl cyclohexylamine (C, 80 g) added under agitation. The reaction mixture was heated to 120° C. whereupon an exothermic reaction ensued which peaked at ca. 160° C. The reaction mixture was allowed to react for two hours. The resultant epoxy resin was a non-tacky semi solid, exhibiting good solubility in acetone. The resin was cooled to 100° C., and water (500 g) added continuously over 90 minutes while maintaining a temperature of 85° C. to 95° C. during addition of the first 250 mL and 70° C. to 75° C. during addition of the second 250 mL of water. The resulting emulsion was kept at 60° C. for a further two hours, cooled to below 30° C. and bottled. The epoxy emulsion had a solids content of 50 percent, a viscosity of ca. 7,500 mPa.s at 23° C. and an EEW of ca. 1250.

Poly(methylenecyclohexanamine) in benzyl alcohol with an amino hydrogen equivalent weight (AHEW) of 108 (Ancamine 2280, Anchor Chemicals UK, 8.4 g) was emulsified into the epoxy emulsion prepared above (100 g) by hand stirring. Water (15 mL) was then added for dilution. Films were cast from this blend on Bonder 26 60 0 C. steel panels using a 200 micrometer draw down bar. The coatings became tack free after one hour, and withstood 100 MEK double rubs after 24 hours cure at 23° C., and 200 MEK double rubs after 7 days cure at 23° C. A drop of water placed on this coating after 7 hours did not attack or dissolve the film: the adhesion of the coating was excellent. After 7 days cure at room temperature, the coating formed developed an impact of 17 Joules and an Erichsen indentation value of 9.

EXAMPLE 2

A reaction sequence, reactants and equipment similar to those used in Example 1 were employed. Diglycidyl ether of bisphenol-A having an epoxy equivalent weight (EEW) of 180 (A, 387 g) and a polyoxyalkylene diglycidyl ether having an epoxy equivalent weight of 5450 and an ethylene oxide/propylene oxide mole ratio of 5:1 (B, 63 g) were charged into the reactor and heated within 30 minutes to 100° C. under a nitrogen blanket. Agitation was applied after B was molten, and tert-octylamine (C, 80 g) added under agitation. The reaction mixture was heated to 120° C., whereupon an exothermic reaction ensued which peaked at ca. 145° C. The reaction mixture was allowed to react for two hours. The resin was cooled to 70° C., and water (470 g) added over one hour while maintaining a temperature of 50° C. to 70° C. The resulting emulsion had a solids content of 52.5 percent, a viscosity of 10,000 to 15,000 mPa.s at 23° C. and an EEW of ca. 1075.

This advanced epoxy emulsion was pigmented as shown in Table I and cured with a 1:1 by weight blend of the relatively hydrophobic curing agents polyamidoamide Versamid 140 (AHEW 125, Cray Valley, Newport, Wales, United Kingdom) and polyoxypropylenediamine with a molecular weight of 400 (Jeffamine 400, Texaco Chemicals Company). The pigmented systems described in Table I were further diluted with water, and sprayed on Bonder 26 60 0C panels. The paint formulations dried within 30 minutes at 23° C.: after 7 days cure at 23° C. the coated panels withstood more than 200 MEK double rubs and had excellent condensed water resistance (7 days exposure to condensed humidity at 55° C.).

TABLE I

Pigmented Water Emulsified Reactive Epoxy Polymer Comparisons

| PROCEDURE/INGREDIENTS | PAINT I* Weight | PAINT 2** Weight |
|---|---|---|
| Mix under Agitation | | |
| Epoxy Emulsion (EEW 1075, Non-Volatile Content 52,5%) - Example 2 | 49.78 | 41.82 |
| Water, demineralized. | 10.23 | 16.10 |
| Iron oxide red (Bayferrox 130M/Bayer AG, Leverkusen, Germany) | — | .81 |
| Pigment mixture of $Fe_2O_3$ and $Mn_2O_3$ (Bayferrox 303T/Bayer AG) | 1.14 | — |
| Iron oxide yellow (Bayferrox 920/Bayer AG) | — | .81 |
| Titanium dioxide (Finntitan RR2/Kemira, Pori, Finland) | 3.73 | 11.53 |
| Talcum - contains magnesite $MgCO_3$ (Talcum AT Extra/Norwegian Talc Deutschland GmbH, Bad Soeden-Salmuenster, Germany) | 1.82 | — |
| Calcium carbonate (Durcal 10/OMYA GmbH, Koeln, Germany) | 17.54 | — |
| Muscovite-mica (Micro Mica W 1/Norwegian Talc, Deutschland GmbH) | 9.37 | — |
| Precipitated barium sulfate (Blanc Fix N/Sabed, Massa, Italy) | — | 11.53 |
| Zinc phosphate (Sicor ZNP/S/BASF AG, Ludwigshafen, Germany) | — | 11.53 |
| Emulsion of hydrophobic non-volatile, emulsifiers and anti-foaming polysiloxane (BYK 203/Byk-Chemie GmbH, Wesel, Germany) | 0.60 | .59 |
| Disperse on a horizontal pearl mill under cooling (<40° C.) to <10 μm | | |
| Add under agitation | | |
| Polyaminoamide (Versamid 140/Cray Valley) | | 54.40 |
| Polyoxypropylene diamine (Ancamine 480/Anchor Chemical) | .79 | |
| Catalyst blend at AHEW ca. 124 (Ancamine K 54/Anchor Chemical) | | |
| Leveling agent (BYK S 715/Byk-Chemie GmbH) | | 81 |
| Polyether modified methylalkyl-polysiloxane-copolymer (BYK A 525/Byk-Chemie GmbH) | | 81 |
| TOTAL AMOUNT | 00.00 | 1100.00 |

*Paint I = grey paint
**Paint 2 = rose red paint

EXAMPLE 3

Following the method of Example 1, diglycidyl ether of Bisphenol-A having an epoxy equivalent weight (EEW) of 180 (A, 141.6 g), bisphenol-A (B, 44.5 g), a polyoxyalkylene diglycidyl ether having an epoxy equivalent weight of 5450 and an ethylene oxide/propylene oxide mole ratio of 5:1 (C, 64.7 g), p-tert-butyl phenol (D, 7.6 g) and methoxypropanol (E, 4.2 g) were charged into the reactor and heated within 30 minutes to 80° C. under a nitrogen blanket.

Agitation was applied, the mixture was heated to 90° C., and ethyltriphenylphosphonium acid acetate 70 percent active in methanol (F, 0.4 g) was added under agitation. The mixture was heated to 115° C. whereupon an exothermic reaction ensued which peaked at ca. 140° C. The reaction mixture was then further heated at 145° C. for 2 hours to yield an advanced epoxy resin with an epoxy equivalent weight of 760.

This resin was cooled to 90° C. and the polyoxypropylenediamine with a molecular weight of 400 (Jeffamine D400, G, 163.6 g) and isophorone diamine (H, 67.4 g) added under agitation. All heating was switched off, and the reaction contents cooled to about 70° C. before an exothermic reaction took place which peaked out at 86° C. The reaction mixture was heated slowly to 120° C. over 45 minutes, maintained at this temperature for 1.5 hours and cooled to 99° C. over 15 minutes. Water (404.0 g) was continuously added over 35 minutes with agitation while maintaining a temperature of at least 65° C., and the resulting emulsion stirred at 60° C. for 30 minutes before cooling to below 30° C. and bottling.

The resulting emulsion had a solids content of 55 percent, a viscosity of ca. 5,000 mPa.s at 23° C., an amino hydrogen equivalent weight (AHEW) of ca. 315 and a pH of 11.4.

EXAMPLE 4

Poly (methylenecyclohexamine) (Ancamine X2280/Anchor Chemical, 85 g) was intimately mixed at room temperature with dispersing aid Disperbyk 182 (Byk Chemie, 10.5 g) and tris-2,4,6-dimethylaminomethylphenol (Ancamine K54/Anchor Chemicals, 4.5 g).

EXAMPLE 5

A reaction sequence, reactants and equipment similar to those used in Example 1 were employed. Diglycidyl ether of bisphenol-A having an epoxy equivalent weight (EEW) of 180 (A, 235 g), a polyglycidyl ether of a bisphenol-F with a functionality of 2.2 and an EEW of 168 (B, 100 g), a polyoxyalkylene diglycidyl ether having an epoxy equivalent weight of 5450 and an ethylene oxide/propylene oxide mole ratio of 5:1 (C, 60 g) and bisphenol-A (D, 42.5 g) were charged into the reactor and heated within 30 minutes to 80° C. under a nitrogen blanket. Agitation was applied, the mixture was heated to 90° C., and ethyltriphenylphosphonium acid acetate 70 percent active in methanol (E, 0.6 g) was added under agitation. The mixture was heated to 115° C. whereupon an exothermic reaction ensued which peaked at ca. 165° C. The reaction mixture was then further heated at 145° C. for 1.5 hours to yield an advanced epoxy resin with an epoxy equivalent weight of 288. This resin was cooled to 100° C. and a polyoxypropylenediamine with a molecular weight of 2000 (Jeffamine D 2000, F, 62.5 g) added under agitation. The reaction mixture was allowed to react at between 92 and 95° C. for one hour.

Water (500.0 g) was continuously added over one hour with agitation while maintaining a temperature of at least 70° C., and the resulting emulsion stirred at 60° C. for one hour before cooling to below 30° C. and bottling.

The resulting emulsion (Example 5) had a solids content of 50 percent, a viscosity of 2,000 to 8,000 mPa.s at 23° C. and an EEW of ca. 718 (based on emulsion).

Formulations to produce clear coats containing the epoxy resin emulsion prepared as described above separately with the three hardeners (Example 5.1) a polyamino epoxy adduct solution in water at 70 percent solids and AHEW 200 as solution (Anquamine 401/Anchor Chemical), (Example 5.2) the amine curing agent the preparation of which was described in Example 3 and (Example 5.3) the amine curing agent the preparation of which is described in Example 4, are described in Table II as Systems 1 to 3 respectively, and the clear coat properties obtained by curing these systems at 23° C. are described in Table III. Pigmented paint formulations based on the resin and hardener components described in this Example 5 are described in Tables IV, V and VI and a comparison of general properties of the paints produced from these formulations by curing separately at 23° C. and at 10° C. are shown in Table VII. Corrosion resistance properties for the paints produced from these formulations by curing at 23° C. are shown in Table XIII.

TABLE II

Clear Coat Formulations

| INGREDIENTS IN PARTS BY WEIGHT | SYSTEM 1 | SYSTEM 2 | SYSTEM 3 |
| --- | --- | --- | --- |
| Mix under agitation for 15 minutes | | | |
| Epoxy Emulsion - Example 5 | 721.7 | 618.1 | 716.0 |
| Curing Agent 5 (1) | 198.8 | — | — |
| Curing Agent 5 (2) | — | 267.7 | — |
| Curing Agent 5 (3) | — | — | 142.0 |
| Tris-2,4,6-dimethylaminophenol (Catalyst Ancamine K54/ Anchor Chemicals) | — | 13.9 | — |
| Dilute with demineralized water | 79.5 | 100.3 | 142.0 |
| Viscosity at 23° C. [mPa.s] | ca. 3000 | ca. 4500 | ca. 2500 |
| Application solids, % | 50.0 | 50.0 | 50.0 |
| Amine-H to epoxy equivalent wt. ratio | 1:1 | 1:1 | 1:0.9 |

TABLE III

Clear Coat Performance Properties

| FEATURE | SYSTEM 1 | SYSTEM 2 | SYSTEM 3 |
| --- | --- | --- | --- |
| I) Wet varnish | | | |
| Per cent benzyl alcohol at application viscosity | zero | zero | ca. 7 |
| Pot life [h] | max. 3 | 1.5 | max. 2.5 |
| Through film drying time (TFDT) [h] | ~6 | ~8 | ~6 |
| II) Dry film (on Bonder 26-60-0C) | | | |
| Film Thickness [μm] | 43 | 57 | 45 |
| Persoz hardness [s] | | | |
| 1 d RT cure | 40 | 60 | 90 |
| 7 d RT cure | 90 | 159 | 236 |
| Film appearance | Hazy | Sl. Hazy | High clarity |
| Cross-hatch adhesion [% remain] 7 d RT cure | 100 | 100 | 100 |
| Erichsen indentation [mm] 7 d RT cure | >10 | 9 | 9 |
| Resistance to water-spotting 1 d RT cure | poor | good | excellent |
| Resistance to MEK rubs 1 d RT cure | >100 | 100 | >150 |

TABLE IV

Paint Formulation 1

| PROCEDURE/INGREDIENTS | WEIGHT |
|---|---|
| Mix under agitation | |
| Aqueous Comparative Example 5 | 312.70 |
| Finntitan RR2 (Titanium dioxide iron Kemira) | 101.72 |
| Sicor ZNP/S (Zinc phosphate from BASF) | 101.72 |
| Blanc fix N (barium sulfate from Solvay SA, B-1050 Brussels, Belgium) | 101.72 |
| Bayferrox 130M (Iron oxide, red from Bayer AG) | 7.13 |
| Bayferrox 920 (Iron oxide, yellow from Bayer AG) | 7.13 |
| Demineralized water | 86.36 |
| Byk 023 (Defoamer from Byk Chemie GmbH) | 4.81 |
| Disperse on a horizontal pearl mill under cooling (<40° C.) to <10 μm | |
| Add under agitation a pre-solution containing: | |
| Epoxy Curing Agent for Example 5 (1) | 87.57 |
| Demineralized Water | 189.13 |
| Add demineralized water for required application viscosity Parameters | 1000.00 |
| Solids content: | 53.7 |
| Pigment/binder ratio: | 1:0.7 (solids) |
| Pigment Volume Concentration (PVC) | 30.0% |

TABLE V

Paint Formulation 2

| PROCEDURE/INGREDIENTS | WEIGHT |
|---|---|
| Mix under agitation | |
| Curing Agent from Example 5 (2) | 124.77 |
| Catalyst Ancamine K54 (Anchor Chemicals Ltd.) | 8.76 |
| Finntitan RR2 (Titanium dioxide) | 112.77 |
| Sicor ZNP/S (Zinc phosphate) | 112.77 |
| Blanc fix N (Barium sulphate) | 112.77 |
| Bayferrox 130M (Iron oxide, red) | 7.90 |
| Bayferrox 920 (Iron oxide, yellow) | 7.90 |
| Demineralized water | 65.32 |
| Byk 033 (Defoamer) | 2.22 |
| Disperse on a horizontal pearl mill under cooling (<40° C.) to <10 μm | |
| Add under agitation | |
| Aqueous Epoxy comparative for Example 5 | 287.92 |
| Demineralized Water | 156.90 |
| Add demineralized water for required application viscosity Parameters | 1000.00 |
| Solids content: | 57.6 |
| Pigment/binder ratio: | 1:0.7 (solids) |
| PVC | 30% |

TABLE VI

Paint Formulation 3

| PROCEDURE/INGREDIENTS | WEIGHT |
|---|---|
| Mix under agitation | |
| Aqueous Epoxy comparative from Example 5 | 443.66 |
| Finntitan RR2 (Titanium dioxide) | 76.01 |
| Sicor ZNP/S (Zinc phosphate) | 76.01 |
| Blanc fix N (Barium sulphate) | 76.01 |
| Bayferrox 130M (Iron oxide, red) | 5.32 |
| Bayferrox 920 (Iron oxide, yellow) | 5.32 |
| Demineralized water | 31.14 |
| Byk 023 (Defoamer) | 4.65 |

TABLE VI-continued

Paint Formulation 3

| PROCEDURE/INGREDIENTS | WEIGHT |
|---|---|
| Disperse on a horizontal pearl mill under cooling (<40° C.) to <10 μm | |
| Add under agitation | |
| Curing Agent from Example 5.3 | 88.98 |
| Then add demineralized water | 192.90 |
| Add demin. water for required application viscosity Parameters | 1000.00 |
| Solids content: | 55.0 |
| Pigment/binder ratio: | 1:1.3 |
| PVC | 20% |

TABLE VII

| GENERAL PROPERTIES | PAINT 1 | PAINT 2 | PAINT 3 |
|---|---|---|---|
| Water-borne Paints 1, 2 and 3 - Comparison of General Properties (Cure at 23° C.) | | | |
| Contains epoxy hardener | 5.1 | 5.2 | 5.3 |
| Pigment volume concentration of point [%] | 30 | 30 | 20 |
| Coating thickness [μm] | ca. 55 | ca. 55 | ca. 55 |
| Drying time, tack-free [h] | 1.8 | 2.5 | 2.8 |
| Gloss 20°/60°/80° | 1/2/33 | 1/6/27 | 9/50/86 |
| MEK resistance [DR] 1. day cure | >100 | 80 | >100 |
| Pendulum hardness according to Persoz [s] | 133 | 137 | 198 |
| Cross-cut adhesion tape test remain [%] | 100 | 100 | 100 |
| Erichsen indentation [mm] | | | |
| 7. day cure | 5.5 | 3.5 | 5.0 |
| 14. day cure | 3.3 | 3.4 | 4.5 |
| Water-borne Paints 1, 2 and 3 - Comparison of General Properties (Cure at 10° C./80% RH) | | | |
| Contains epoxy hardener | 5.1 | 5.2 | 5.3 |
| PVC of paint [%] | 30 | 30 | 20 |
| Coating thickness [μm] | ca. 55 | ca. 55 | ca. 55 |
| Gloss 20°/60°/80° | 1/3/36 | 3/22/50 | 14/62/91 |
| MEK resistance [DR] 7 days cure | >100 | >100 | >100 |
| Pendulum hardness according to Persoz [s] | 68 | 76 | 111 |
| Cross cut adhesion tape test remain [%] | 100 | 100 | 100 |
| Erichsen indentation [mm] | 6.1 | 3.9 | 8.7 |

TABLE VIII

Corrosion Resistance Paint 1, 2 and 3

| PROPERTIES | PAINT 1 | PAINT 2 | PAINT 3 |
|---|---|---|---|
| Humidity ASTMD 4885-86A 7 days constant at 55° C. blisters [10 = best] | 0 | 5 | 7 |
| Adhesion after 24 h recovery at 23° C./50% RH tape, remain [%] | 0 | 99 | 99 |
| Salt spray - ASTM (B-117-730* [H] | 350 | 500 | 1000 |
| Scripe creep [mm] | ca.2 | 0 | 0 |
| Scripe blisters [10 = best] | 4 | 4 | 9 |
| Surface blisters [10 = best] | 4 | 4 | 9 |
| Surface corrosion | none | none | none |

*Determine on 40 μm Sand Blasted Steel with peak to valley ratio of maximum 40 μm, with 50 μm first coat and 60 μm second coat

EXAMPLE 6

A reaction sequence, reactants and equipment similar to those used in Example 1 were employed. A polyglycidyl ether of a phenolic novolac with a functionality of 3.6 and an EEW of 178 (A, 390 g), and a polyoxyalkylene diglycidyl ether having an epoxy equivalent weight of 5450 and an ethylene oxide/propylene oxide mole ratio of 5:1 (B, 60 g) were charged into the reactor and heated to 90° C. under a nitrogen blanket. Agitation was applied, the mixture was heated at 90° C. for a further 15 minutes and a polyoxypropylenediamine with a molecular weight of 2000 (Jeffamine 2000, C, 50.0 g) added under agitation. The temperature dropped to 84° C. and the mixture became turbid. The reaction mixture underwent an exothermic reaction to yield a clear solution at 90° C. The mixture was heated to 100° C. and maintained at this temperature for 15 minutes before water (250.0 g) was continuously added over 30 minutes with agitation while maintaining a temperature of 85° C. to 95° C. The mixture was maintained at 90° C. for 15 minutes before water (118.0 g) was continuously added over 15 minutes with agitation while maintaining a temperature of 70° C. to 80° C. The mixture was cooled to 50° C. and maintained at this temperature for 90 minutes before cooling to below 30° C. and bottling.

The resulting emulsion had a solids content of 57.5 percent, a viscosity of 2,500 mPa.s at 23° C. and an EEW of ca. 415.

A water-emulsified reactive polymer composition was produced by dispersing the amine curing agent, the preparation of which is described in Example 4 (13 g) with the epoxy-functional emulsion prepared as described above (42 g).

Wet coatings were cast on glass plates, and on Bonder steel panels 26 60 0 C. at 200 micrometer wet thickness. The through film drying time of the film was ca. 2 hours, when cured at 23° C. Water, acid and solvent resistance of the cured coatings was much better than that normally obtained from water emulsified reactive polymer compositions derived from water-dispersed epoxy resins and amine curing agents. Specifically, these films exhibited faster cure time of ca. 3 hours than the ca. 12 hours of typical water dispersed bisphenol-A type liquid epoxy resin systems: these films described in Example 8 also had a solvent resistance some two to three times better and a water spotting resistance some four times better than typical water-dispersed bisphenol-A type liquid epoxy resin systems.

EXAMPLE 7

A diglycidyl ether of bisphenol-A having an epoxy equivalent weight (EEW) of 510 (A, 174 g), a diglycidyl ether of bisphenol-A having an epoxy equivalent weight (EEW) of 182 (B, 126 g), and a polyoxypropylene diglycidyl ether with EEW 328 (D.E.R.™ 732, trademark of The Dow Chemical Company, C, 300 g) were mixed into a 1 litre vessel, held in an oven at 80° C. for one hour and thoroughly mixed until a clear, homogeneous mixture was formed.

EXAMPLE 8

A reaction sequence and equipment similar to those used in Example 1 were employed. A polyoxyalkylene diglycidyl ether having an epoxy equivalent weight of 5450 and an ethylene oxide/propylene oxide mole ratio of 5:1 (A, 71.5 g) and isophoronediamine (B, 187 g) were added to the reactor and heated over a period of 20 minutes to 75° C. Agitation was started and the mixture heated to 90° C. and maintained at this temperature for 15 minutes. The polyepoxide blend produced in Example 7 (291.5 g) was added at a temperature of 90 to 95° C. over a period of 40 minutes, and the mixture maintained at 90° C. for a further 90 minutes. The contents were cooled to 80° C. and water (450 g) added over 45 minutes with agitation while maintaining the temperature of the mixture above 50° C. After water addition was complete, the resultant emulsion was stirred for a further one hour while maintaining the temperature between 45° C. and 50° C., before cooling to 30° C. and bottling. The polymeric aqueous dispersed curing agent exhibited an AHEW of 285 to 315.

EXAMPLE 9

A reaction sequence and equipment similar to those used in Example 1 were employed. A polyoxyalkylene diglycidyl ether having an epoxy equivalent weight of 5450 and an ethylene oxide/propylene oxide mole ratio of 5:1 (A, 65 g) and N,N'-di-tert-butylethylenediamine (B, 84 g) were charged into the reactor and heated to 75° C. under a nitrogen blanket. Agitation was applied, the mixture was heated at 135° C. over 30 minutes and maintained at this temperature for an additional 15 minutes. A polyoxypropylene diglycidyl ether with an EEW of 328 (D.E.R.™ 732, C, 35 g) and a diglycidyl ether of bisphenol-A having an epoxy equivalent weight (EEW) of 180 (D, 316 g) were added under agitation and the temperature raised to 145° C. and maintained at this temperature for 2 hours. The mixture was then cooled to 90° C. before water (500.0 g) was continuously added over a period of 45 to 60 minutes with agitation while maintaining a temperature of at least 50° C. The mixture was maintained at 50° C. for an additional 30 minutes before cooling to below 30° C. and bottling.

The resulting emulsion had a solids content of 50 percent, a viscosity of 500 to 1000 mpa.s at 23° C. and an EEW of ca. 1000 to 1200. The emulsion was blended in a stoichiometric ratio of 1:1 with the polymeric epoxy-amino adduct emulsion the preparation of which is described in Example 8 and cured at temperatures of 10° C. and higher to yield coatings exhibiting a Persoz hardness of 90 and an adhesion of 100 percent after 24 hours cure at 23° C., and an Erichsen indentation of 6 and a resistance to over 100 MEK double rubs after 7 days cure at 23° C. A rapid through film drying time is a feature of the systems prepared from the epoxy emulsion described in Example 9.

COMPARATIVE EXAMPLE 10

Polyethylene glycol with an average molecular weight (Mw) of 3000 (technical grade, 150 g) and a bisphenol-A based polyglycidyl ether with an epoxy equivalent weight of 185 (18.5 g) were heated to 100° C. and diluted under agitation with boron trifluoride etherate (0.9 g) diluted to 5 weight percent with dioxane. The mixture was heated to 130° C., and maintained at this temperature until the ensuing reaction had ceased, as witnessed by an increase in the epoxy equivalent weight. The epoxy equivalent weight of the product A was ca. 360,000. A bisphenol-A based polyglycidyl ether with an epoxy equivalent weight of 183 (325 g), bisphenol-A (98 g), the adduct A (27 g) and triphenylphosphine (750 mg) were mixed in a two-liter three-necked flask equipped with a thermometer, an agitator, a reflux condenser and a dropping funnel and heated at between 150° C. to 160° C. until an epoxy equivalent weight of 490 to 500 was obtained. The mixture was cooled and diluted with benzyl alcohol (27 g) and methoxypropanol (60 g). The temperature was reduced to below 100° C. and water (105 g) was added continuously over a period of 5 to 30 minutes while maintaining an agitator speed of 800 rpm and allowing the temperature to fall to between 70° C. and 60° C. An aqueous dispersion was obtained which was further diluted with water (173 g). The dispersion had a solids content of 55.7 percent and a viscosity of 11,700 mPa.s. A water-emulsified reactive epoxy polymer composition can be prepared from this dispersion by the addition, under agitation, of any common amine hardener suited for curing aqueous systems.

COMPARATIVE EXAMPLE 11

Isophorone diamine (26 g) was added to a three-necked glass flask equipped with a thermometer, an agitator and a condenser, and the contents were thoroughly agitated while maintaining a temperature of between 40° C. to 50° C. A polyglycidyl ether, having an epoxy equivalent weight of 1980 obtained from one mole of propylene oxide/ethylene oxide random polymer type polyether polyol PR-3009 (Asahi Denka Kogyo K. K.) having a molecular weight of 3,000 and an ethylene oxide content of 85 percent by weight and 2.2 moles of epichlorohydrin, (13 g) and the hydrophobic epoxy compound EP-4901(EEW 182, Asahi Denka Kogyo K. K., 12 g) were added slowly while checking heat generation. The reaction was allowed to take place over two hours at 90° C., and water (13 g) was added to obtain the self-emulsifying activated curing agent (X). Adeka resin EP-4200 (Asahi Denka Kogyo K. K., EEW 190, 10 g) the self-emulsifying activated curing agent X (7 g) and water (10 g) were mixed and cured. The film performance was tested to give the following results. Film condition after 24 hours was "good," 'pencil hardness was "H,"' water resistance after 7 days of soaking was "good" and adhesion (mortar board checkerboard test) was 100/100.

COMPARATIVE EXAMPLE 12

Preparation of Amine-epoxide Adduct (66 Percent Capped)

Into a one-liter reaction flask equipped with a stirrer, heating mantle, nitrogen line, cooling condenser, and thermometer was charged 485 grams (0.4 equivalents) Jeffamine 2000 (Texaco Chemical Company, Houston, Tex.) and 142.2 grams (0.61 equivalents) of polyepoxide of propoxylated (5PO) pentaerythritol (Henkel Corporation, Ambler, Pa.). The reaction mixture was heated slowly to 125° C. to 130° C. with stirring and held at this temperature for about 2.5 hours. The reaction mixture was then cooled to 70° C. and analyzed for epoxide and amine content. The product amine polyepoxide adduct had 0.4 meq/gm of total amine and 0.33 meq/gm of epoxide which indicated that about 66 percent of the initial free epoxide groups had been reacted with the amine.

Preparation of Self-Dispersing Resin

Into a 250 mL reaction flask equipped with heating mantle, nitrogen line, cooling condenser, thermometer and stirring means, was charged 66.4 grams (0.348 equivalents) of the diglycidyl ether of bis-phenol A, and 19.6 grams (0.172 equivalents) of bis-phenol A. The reactants were heated to 95° C. and then 12.0 grams (0.004 equivalents) of the amine-epoxide adduct prepared above was added with 0.15 grams triphenyl phosphine. The reaction mixture was heated slowly to 150° C. with stirring whereupon an exothermic reaction was observed, cooling was immediately applied to maintain the reaction temperature between 150° C. and 160° C. After the exothermic reaction subsides, the reaction mixture was maintained at 160° C. for an additional hour followed by a 15 minute period at 190° C. The reaction mixture was then cooled to 160° C. and 14 grams of propyl Cellosolve™ (trademark of Union Carbide Corporation) was added which immediately began refluxing. The reaction mixture was cooled to 100° C. and analyzed. The resultant self-dispersing resin, present at 87.5 percent solids in propyl Cellosolve™, has 0.07 meq/gm total amine and an epoxide equivalent weight of 552 based on resin solids.

Preparation of Water-Borne Dispersion

Into a 500 mL reaction flask equipped with a stirrer, heating mantle, nitrogen line, cooling condenser and thermometer was charged 112 grams of the self-dispersing resin (SDR) prepared as above. The resin was heated to 100° C. whereupon 16.5 grams of water were added gradually with stirring over a thirty minute period while the temperature dropped to about 55° C. Then an additional 48 grams of water was added as the temperature was brought to 70° C. over twenty minutes. At 70° C., there was added 2 grams of water followed by stirring for twenty minutes and then 3 grams of water was added. The resulting water in oil dispersion was stirred for 45 minutes while it cooled to 45° C., and thereafter was in the form of an oil in water dispersion. After the inversion was completed, 2.0 grams of $C_{5-10}$ alcohol mono-glycidyl ether from CVC Specialty Chemicals Corp. was added as a reactive diluent. Then 36.3 grams of water was added at 50° C. over a one hour period. The resulting water-borne dispersion contained 56 percent resin solids in water/propyl Cellosolve™ (82/18) solvent.

Preparation of Coating Composition

Into a 25 mL plastic cup was charged 12.4 gm (56 percent solids) of the water-borne dispersion prepared as above followed by an equal equivalent amount (2 gm) of epoxy curing agent available as 8290 by HiTech (a modified diethylene triamine with a hydrogen equivalent weight of 163). Sufficient water is then added to bring the mixture to a spreadable consistency. The epoxy dispersion/curing agent blend is aged for 10 minutes then a film casting was produced by drawing the blend down on a pre-sanded TRU COLD cold rolled steel panel (3×6×0.32 inches) using a #34 wire wound steel rod. The film was tack-free after 45 minutes. The physical properties of the coating composition which were rated "PASS" were measured after the film had air-dried at room temperature for 28 days.

What is claimed is:

1. An aqueous polymeric epoxy emulsion preparable by:
  (i) reacting
    a) a polvoxyalkylenediamine or a polyamine corresponding to the following formulas:

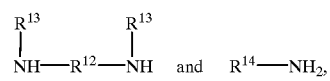

wherein $R^{13}$ is independently in each occurrence a $C_{1-10}$ straight- or branched-chain alkyl moiety or hydrogen: $R^{12}$ is independently in each occurrence cyclohexyl, substituted cyclohexyl or a $C_{1-50}$ hydrocarbylene moiety, which may be substituted with a non-interfering substituent and which may contain one or more secondary amines, ether, amine or thioether moieties in the backbone; and $R^{14}$ is a $C_{1-25}$ linear, branched, alicyclic or polyalicyclic moiety
    b) optionally at least one further amine,
  with
    c) at least one polyepoxide,
    d) at least one polyoxyalkylene diglycidyl ether,
    e) optionally a polyhydroxy hydrocarbon, and
    f) optionally an advancement catalyst,
      to produce an epoxy terminated reaction product, and (ii) emulsifying the epoxy-terminated reaction product in water to provide an aqueous polymeric epoxy emulsion having an epoxy equivalent weight of 375 or more.

2. A reactive polymer emulsion preparable by:
(i) reacting
  a) a polyoxyalkylenediamine or a polyamine corresponding to the following formulas:

wherein $R^{13}$ is independently in each occurrence a $C_{1-10}$ straight- or branched-chain alkyl moiety or hydrogen; $R^{12}$ is independently in each occurrence cyclohexyl, substituted cyclohexyl or a $C_{1-50}$ hydrocarbylene moiety, which may be substituted with a non-interfering substituent and which may contain one or more secondary amines, ether, amine or thioether moieties in the backbone; and $R^{14}$ is a $C_{1-25}$ linear, branched, alicyclic or polyalicyclic moiety,
  b) optionally at least one further amine,
  with
  c) at least one polyepoxide,
  d) at least one polyoxyalkylene diglycidyl ether,
  e) optionally a polyhydroxy hydrocarbon, and
  f) optionally an advancement catalyst, to produce an epoxy-terminated reaction product,
(ii) emulsifying the epoxy-terminated reaction product in water to provide an aqueous polymeric epoxy emulsion and
(iii) dispersing or dissolving a curing agent in the aqueous polymeric epoxy emulsion reaction product to provide an emulsified reactive polymer composition, wherein the organic solvent content, if any, of the composition is not more than 1.5 percent.

3. An emulsion as claimed in claim 1 or claim 2, wherein
(i) the polyhydroxy hydrocarbon is present and is a polyhydroxy phenol, and/or;
(ii) the advancement catalyst is employed and/or,
(iii) an organic solvent is employed, in an amount not exceeding 1.5 percent.

4. An emulsion as claimed in any one of the preceding claims, wherein the said at least one further amine includes a monofunctional amine, a polyamine, or a mixture of two or more thereof.

5. A process for preparing an aqueous polymeric epoxy emulsion which process comprises:
(i) reacting
  a) a polyoxvalkylenediamine or a polyamine corresponding to the following formulas:

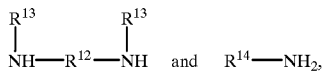

wherein $R^{13}$ is independently in each occurrence a $C_{1-10}$ straight- or branched-chain alkyl moiety or hydrogen, $R^{12}$ is independently in each occurrence cyclohexyl, substituted cyclohexyl or a $C_{1-50}$ hydrocarbylene moiety, which may be substituted with a non-interfering substituent and which may contain one or more secondary amines, ether, amine or thioether moieties in the backbone: and $R^{14}$ is a $C_{1-25}$ linear, branched, alicyclic or polyalicyclic moiety,
  b) optionally at least one further amine, with
  c) at least one polyepoxide,
  d) at least one polyoxyalkylene diglycidyl ether,
  e) optionally a polyhydroxy hydrocarbon, and
  f) optionally an advancement catalyst, to produce an epoxy-terminated reaction product, and
(ii) emulsifying the epoxy-terminated reaction product in water to provide an aqueous polymeric epoxy emulsion having an epoxy equivalent weight of 375 or more.

6. A process for preparing a reactive polymer emulsion which process comprises:
(i) reacting
  a) a polyoxyalkylenediamine or a polyamine corresponding to the following formulas:

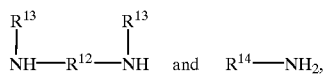

wherein $R^{13}$ is independently in each occurrence a $C_{1-10}$ straight- or branched-chain alkyl moiety or hydrogen; $R^{12}$ is independently in each occurrence cyclohexyl, substituted cyclohexyl or a $C_{1-50}$ hydrocarbylene moiety, which may be substituted with a non-interfering substituent and which may contain one or more secondary amines, ether, amine or thioether moieties in the backbone, and $R^{14}$ is a $C_{1-25}$ linear, branched, alicyclic or polyalicyclic moiety,
  b) optionally at least one further amine, with
  c) at least one polyepoxide,
  d) at least one polyoxyalkylene diglycidyl ether,
  e) optionally a polyhydroxy hydrocarbon, and
  f) optionally an advancement catalyst, to produce an epoxy-terminated reaction product,
(ii) emulsifying the epoxy-terminated reaction product in water to provide an aqueous polymeric epoxy emulsion and
(iii) dispersing or dissolving a curing agent in the aqueous polymeric epoxy emulsion reaction product to provide an emulsified reactive polymer composition, wherein the organic solvent content, if any, of the of the composition is not more than 1.5 percent.

7. A process as claimed in claim 5 or claim 6, wherein the polyhydroxy hydrocarbon is a polyhydroxyphenol.

8. A process as claimed in any one of claims 5 to 7, wherein the said at least one further amine includes a monofunctional amine, a polyamine, or a mixture of two or more thereof.

9. A process as claimed in any one of claims 5 to 8, wherein the curing agent is added continuously to the polymeric epoxy emulsion reaction product.

10. A reactive polymer emulsion comprising an aqueous polymeric epoxy emulsion as claimed in claim 1, together with a curing agent.

11. A coating which comprises a reactive polymer emulsion as claimed in claim 2 or claim 10, which has been cured.

* * * * *